INVENTOR.
WESLEY L. HUNTER
BY
Edward K. Hung
ATTORNEY

INVENTOR.
WESLEY L. HUNTER

United States Patent Office
3,047,009
Patented July 31, 1962

3,047,009
BOTTOM LOADING VALVE MECHANISM
Wesley L. Hunter, Arlington Heights, Ill., assignor to The
Pure Oil Company, Chicago, Ill., a corporation of Ohio
Filed July 24, 1959, Ser. No. 829,262
3 Claims. (Cl. 137—403)

This invention relates to a valve mechanism suitable for use in the bottom loading of tanks, and especially of tank trucks. More particularly, this invention relates to a fluid pressure balanced, bottom loading valve mechanism which is opened by the force of fluid pressure in the inlet manifold and is closed automatically when the fluid level in the tank reaches a predetermined point.

In filling tank trucks, it has been found most convenient to load such trucks from the bottom of the tank. It is therefore necessary to provide a valve at the inlet to the tank which will prevent the flow of fluid therefrom after the tank has been filled and the inlet hose disconnected. In order to relieve the operator of the burden of performing unnecessary mechanical functions, and to prevent the spillage of fluid or other accidents in case of the forgetfulness of the operator, it is desirable that the valve open automatically when fluid pressure is applied in the intake manifold to fill the tank. It is further desirable that the valve close automatically when the liquid level in the tank has risen to a predetermined desired height. Thus, overfilling and spillage may be eliminated.

Accordingly, it is an object of this invention to provide a valve mechanism adapted for the bottom filling of tank trucks which automatically opens on the application of inlet pressure to the inlet manifold of said tank, and which automatically closes when the fluid level in said tank reaches a predetermined height. It is a further object of this invention to provide such a valve which is normally biased to the closed position, and which is so constructed that the pressure of fluid tending to escape from said tank when filled will not apply a force tending to urge said valve to the open position. Yet another object of this invention is to provide a pressure-balanced valve adapted for the bottom loading of tank trucks which will open automatically on the application of inlet pressure against said valve, will close automatically when the liquid level in said tank reaches a predetermined height, and includes means by which the valve may be manually opened to discharge the contents of the tank.

Briefly, this invention resides in a valve mechanism comprising a member having a valve closure portion at one end thereof, the other end of said member being enclosed by a cylinder and slidable therein. Fluid communication is established between the interior of said cylinder and the inlet side of the valve closure, whereby pressure applied to the inlet side of the member is exerted equally on the opposite side of the member within said cylinder. The valve is biased to the normally closed position, and since inlet pressure is exerted equally on opposite faces of the valve member, these pressures are balanced. An aperture is provided to relieve the pressure within the cylinder and thus open the valve. Means responsive to the fluid level rise in the tank is provided to close the aperture and thus cause the valve to return to the closed position.

Figure 1:
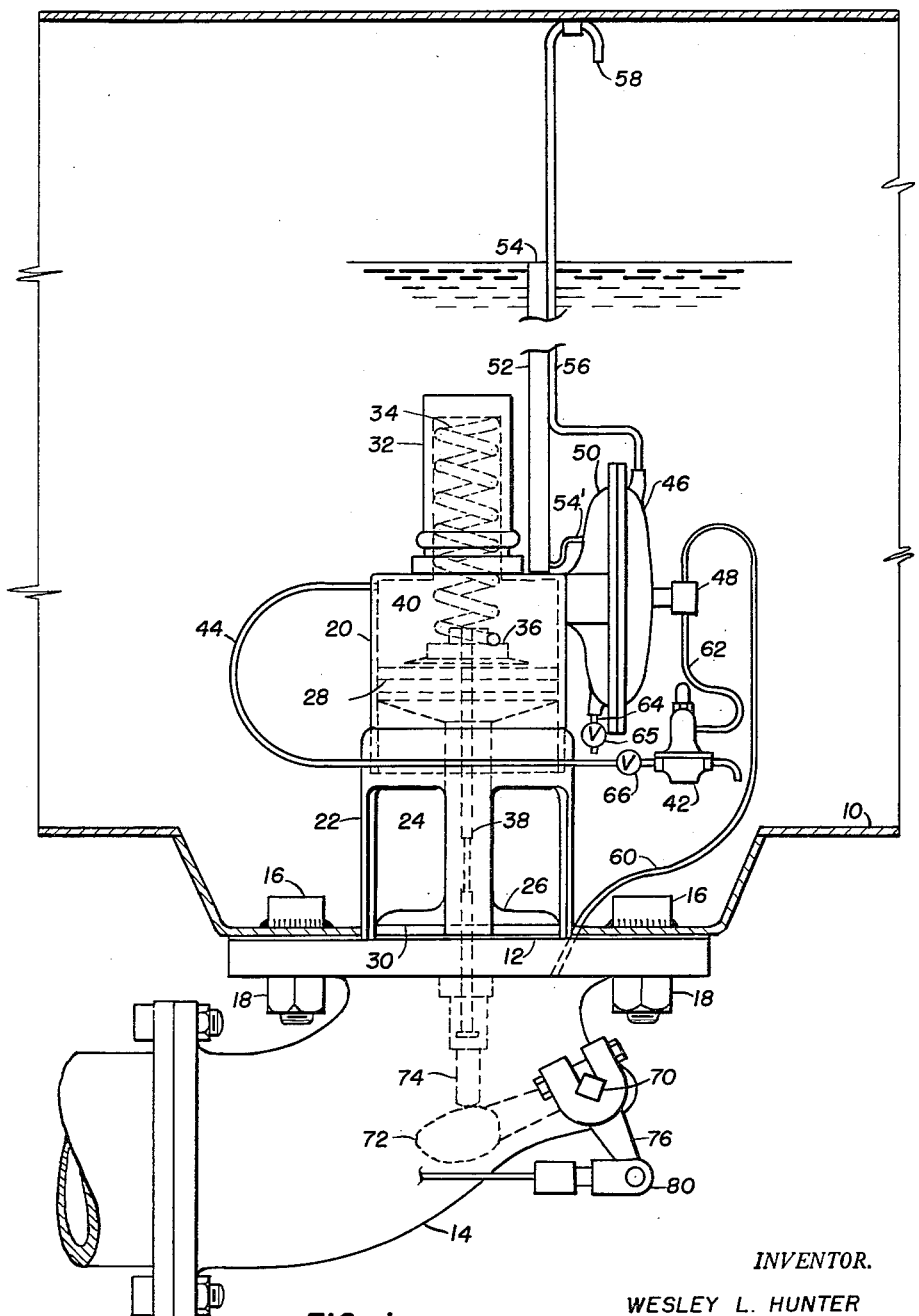
FIGURE 1 is a side elevation, partially in section, of the valve mechanism of this invention.

Referring to FIGURE 1, tank shell 10 has an opening 12 which communicates with manifold 14. The manifold is secured to the tank shell by any suitable means, such as bolts 16 and nuts 18. Cylinder 20 is supported over aperture 12 in axial alignment therewith. Cylinder 20 is supported by cylinder support 22, which is fastened to tank shell 10. The cylinder and cylinder support are preferably threaded together. Cylinder support 22 is equipped with a plurality of openings 24 through which fluid may pass from the tank to manifold 14. Cylinder 20 and cylinder support 22 together form a guide for piston-valve member 26. Piston-valve member 26 has an upper piston portion 28 slidable in cylinder 20. The lower or valve end of the piston-valve member is adapted to form a closure 30 for aperture 12, and cooperates with aperture 12 to form a valve. The piston-valve member is slidable in and guided by cylinder 20 and cylinder support 22. The piston-valve member may cooperate with a valve seat formed either in the tank bottom or in manifold 14.

Cylinder 20 includes a hollow spring extension housing 32 in which is disposed coil spring 34, which bears against surface 36 on the upper or piston end of the piston-valve member. The other end of spring 34 bears against the interior closed end of spring extension housing 32. Thus, spring 34 biases the piston-valve member to the normally closed position. Fluid conduit 38 extends axially through the piston-valve member 26 and provides fluid communication between the interior of intake manifold 14 and space 40 enclosed by cylinder 20 and piston-valve member 26.

Normally open, spring-biased control valve 42 is connected to space 40 enclosed by cylinder 20 and the piston-valve member, and control valve 42 together with conduit 44 provide fluid communication between space 40 and the interior of the tank. Normally closed, spring-loaded, diaphragm pilot-valve assembly 46 includes pilot-valve 48 and diaphragm chamber 50. Overflow-sensing tube 52 is connected by means of conduit 54 to the pressure inlet side of diaphragm chamber 50. Overflow tube 52 terminates in an upper open end 54 which is preferably disposed adjacent to the upper portion of the tank. Breather line 56 communicates with the outlet side of diaphragm chamber 50 and terminates in open end 58 which is preferably secured above open end 54 of overflow tube 52. Normally closed, spring-biased diaphragm pilot valve assembly 46 is preferably selected from one of many sensitive commercially available pressure-operated pilot valves.

Fluid conduit 60 provides fluid communication between the interior of intake manifold 14 and the inlet side of pilot valve 48. Conduit 62 provides fluid communication between the outlet side of pilot valve 48 and the pressure-sensing inlet to normally open, spring-biased, pressure-operated control valve 42. A bleeder outlet 64, equipped with a check valve 65 to prevent back-flow, provides a bleeder passage for flow of fluid between the inlet side of diaphragm chamber 50 and the interior of the tank. A check valve 66 may be provided in conduit 44 to prevent the flow of fluid from the interior of the tank to within space 40 when control valve 42 is in the open position.

Rod 70 extends through manifold 14 and is rotatably supported by the manifold and cooperates with the manifold to provide a fluid-tight seal between rod 70 and the manifold. Lever 72 is supported by rod 70 and adapted to engage lifter extension 74 of the piston-valve member. Arm 76 cooperates with linkage 80 to provide means for rotating rod 70. Rotation of rod 70 in a clockwise direction causes lever 72 to engage lifter extension 74 and move the piston-valve member upward against the closing bias force applied against the piston end of the piston-valve member by spring 34.

The operation of the apparatus will be described assuming the tank is initially empty. Manifold 14 is connected to a suitable fluid source and the inlet fluid pressure is applied within the manifold and against the bottom valve surface of the piston-valve member. Flow of fluid from the manifold through conduit 60 is blocked by normally closed pilot valve 48. Conduit 38 permits fluid flow between the manifold and space 40 which is enclosed by the cylinder and the piston end of the piston-valve member. The fluid pressure applied against the valve surface of the piston-valve member would be balanced by the fluid pressure applied against the piston end of the piston-valve member but for the fact that normally open control valve 42 and conduit 44 provide a pressure relief which reduces the fluid pressure above the piston surface of the piston-valve member. The flow capacities of conduit 38 and conduit 44 must be adjusted to provide a substantial pressure drop between the inlet or manifold end and the outlet or cylinder end of conduit 38. Conduit 38 may be equipped with a suitable constriction or orifice, if required. The size of the constriction or orifice will depend upon the magnitude of the inlet pressure, the viscosity of the fluid, and other factors. Suitable orifice dimensions may be found by trial and error technique or by the application of known hydraulic principles. In any event, the pressure differential existing between the inlet manifold and space 40 above the piston end of the piston-valve member must be sufficient to provide a force sufficient to overcome the force applied by spring 34 to bias the piston-valve member to the normally closed position.

The differential pressure produced by the flow of fluid through conduit 38 causes the piston-valve member to rise and permits the free flow of fluid from the manifold through aperture 12 and into the tank. When the fluid level in the tank reaches the upper open end 54 of overflow-sensing tube 52, fluid spills down into the tube and the head of the column of fluid in the overflow tube is applied to the inlet side of the diaphragm of the normally closed diaphragm pilot-valve assembly. Fluid pressure against the diaphragm opens normally closed pilot valve 48. This releases the full pressure in the inlet manifold to act through conduit 60, pilot valve 48, and conduit 62 to close normally open control valve 42. The closing of control valve 42 prevents the flow of fluid from enclosed space 40 above the piston end of the piston-valve member and the pressure in this space and the pressure in the manifold are equalized. Spring 34 then forces the piston-valve member to closed position and seals aperture 12, preventing the further flow of fluid into the tank. The inlet hose may now be removed from the manifold and the piston-valve member, which is biased to the closed position, will prevent the flow of fluid out of the tank.

Since pressure is no longer applied at the intake manifold, control valve 42 will return to its normally open position. The pressure in the manifold will be atmospheric pressure, and less than the pressure existing at the bottom of the tank. Check valve 66 is provided to prevent the flow of fluid from the tank through the open control valve, through conduit 44 to space 40 above the piston end of the piston-valve member, and through conduit 38 and into the manifold. The pressure at which normally open control valve 42 closes is preferably less than the manifold pressure required to produce a sufficient pressure differential to overcome the force applied by spring 34. Therefor, if for any reason an external pressure is applied to the intake manifold after the tank has been filled, normally open control valve 42 will close before sufficient pressure differential develops to overcome spring 34 and open the valve. Once the control valve has closed, no pressure differential can be produced regardless of the magnitude of the external pressure applied to the inlet manifold.

To discharge the contents of the tank, linkage 80 is actuated with sufficient force to overcome spring 34 and raise the piston-valve member. Fluid then flows from the tank into the manifold and suitable conduit means connected thereto. After the tank is empty, liquid in overflow tube 52 will bleed through bleeder outlet 64 and collect at the bottom of the tank. Bleeder 64 thus provides a means for the removal of the fluid from overflow tube 52. After the head of fluid in the overflow tube has been substantially eliminated, pilot valve 48 will return to the normally closed position. The tank may then be refilled.

Figure 2:
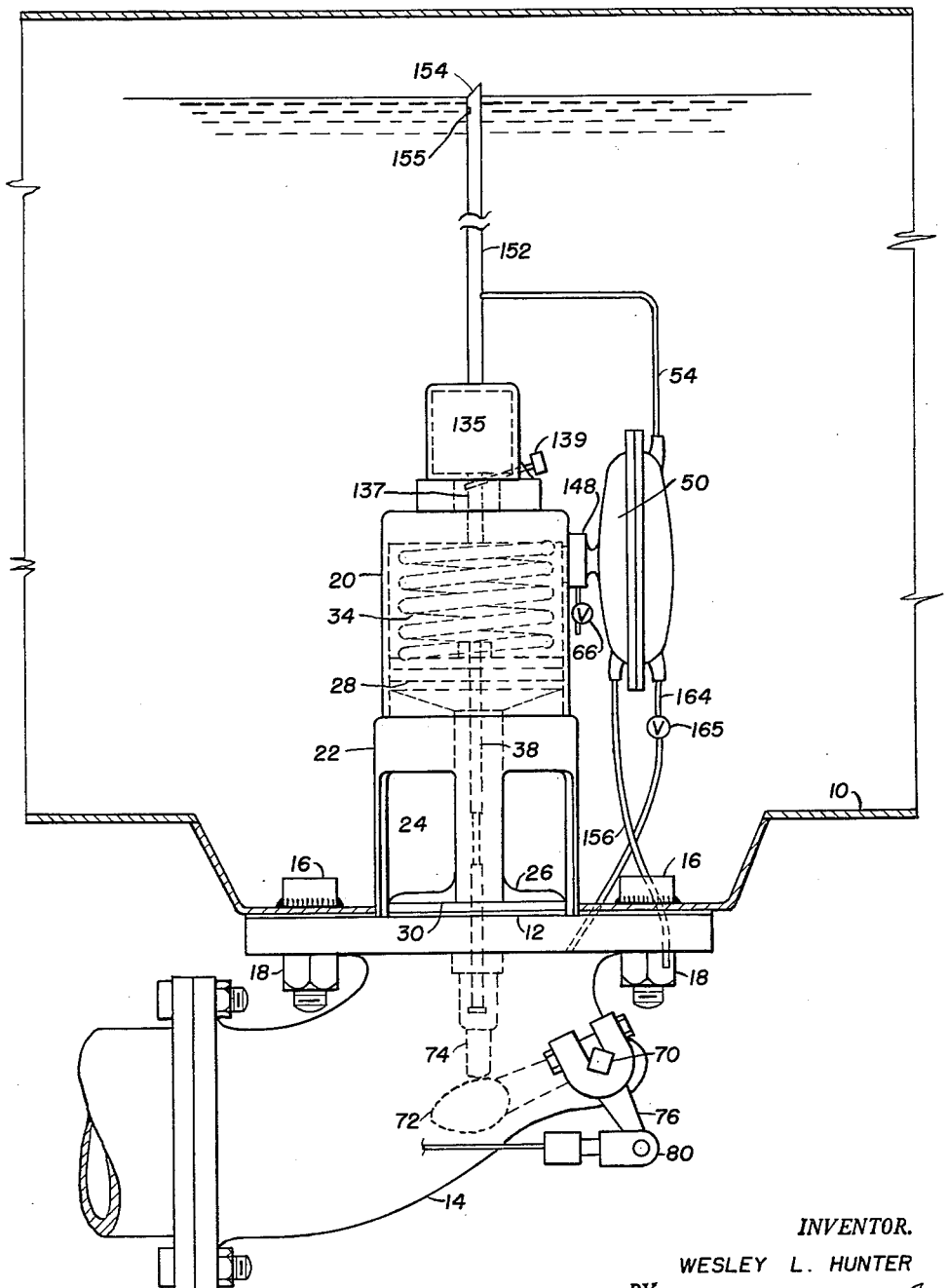
FIGURE 2 is a side elevation, partially in section, of an alternate valve mechanism.

The system comprising control valve 42, pilot valve 48, conduit 60, and conduit 62 is provided to permit utilization of the inlet fluid head to actuate the normally open control valve. This is necessary where a substantial fluid head is required to operate a control valve of suitable size and capacity. The magnitude of the fluid head provided by the overflow tube is relatively small, and is effectively limited by the depth of the fluid in the tank when the tank is filled. Thus, some pressure multiplication device and high pressure source is necessary when the mechanism of this invention is to be used with shallow tanks. When the depth of fluid in the tank after filling is sufficient to provide a satisfactory head, control valve 42, conduit 60, and conduit 62 may be eliminated. FIGURE 2 shows an alternate valve structure containing these and other modifications. Normally closed pilot valve 48 is replaced with a normally open valve 148, and this normally open diaphragm-operated control valve is placed in direct fluid communication with the interior of cylinder 20. Thus, fluid head applied to the diaphragm by a fluid column standing in the overflow-sensing tube will act directly to close this control valve and render inoperative the pressure relief passage this valve provides when open.

The valve of FIGURE 2 is further modified in that bleeder outlet 164 communicates between the fluid pressure-sensing side of diaphragm chamber 50 and the interior of the manifold, rather than with the interior of the tank. Thus, after the tank has been only partially emptied, fluid will drain from the overflow tube into the empty manifold, and the bottom loading valve will open to permit refilling of the tank when inlet pressure is applied. When the overflow-tube bleed arrangement of FIGURE 1 is used, the tank must be substantially emptied before it can be refilled. A check valve 165 has been provided to prevent fluid flow from manifold 14 to the pressure-sensing inlet side of the diaphragm chamber 50.

Breather line 156 has been relocated to communicate with the atmosphere outside of the tank, and thus free the vented side of the diaphragm chamber 50 from possible pressure fluctuations which may occur in the tank during filling. Overflow tube 152 is cut at an angle of about 45° at its upper end, 154. This causes fluid to flow into the tube from one side only, prevents gurgling, and provides a more even increase in pressure at the bottom of the tube. A ⅛-inch diameter hole 155, located about 2 inches below the upper end of the overflow tube, and passing through the wall thereof, has been found to be desirable in that it provides a first trickle of fluid which fills the diaphragm chamber and conduit leading thereto and acts as a cushion against the larger quantities of fluid which fall down the tube when overflow first occurs.

Spring 34 has been placed within cylinder 20, and spring extension housing 32 eliminated. An air-pocket type dash pot 135 is supported above cylinder 20, and communicates therewith through conduit 137. A needle valve 139 is provided to control the effective fluid capacity of conduit 137. By suitable adjustment of needle valve 139, optimum smoothness of valve operation can be obtained, and hydraulic shock effects reduced.

Various other modifications of the disclosed apparatus will be obvious to those skilled in the art. For example, the diaphragm-actuated pilot valve, whether used directly or in conjunction with a control valve and the necessary conduits, may be replaced by a float-actuated valve, adapted to block the flow of fluid through conduit 44 when the level of the float rises above a predetermined point. The float might be disposed in the upper portion of the tank and be contacted directly by the rising level of fluid in the tank. Alternatively, the float may be disposed in a float chamber located adjacent to the remainder of the valve mechanism, and the float chamber may be connected to a suitable overflow-sensing tube.

What is claimed is:

1. A tank valve mechanism comprising a housing adapted to attach to the bottom of a tank, said housing having an aperture formed therein, valve means for opening and closing said aperture including a cylinder having one closed end and supported in axially aligned relationship with said aperture, a piston-valve member, the piston portion of which is slidable in said cylinder, the valve end of which forms a closure for said aperture, said housing being adapted to attach to said tank so that said valve end closes against the direction of flow through said aperture into said tank, means biasing said piston-valve member to the closed position, a fluid conduit communicating the space enclosed by said cylinder and the piston-valve member with the side of said valve end remote from said cylinder, whereby at least a part of fluid pressure applied externally against the valve end of said piston-valve member is applied also to the piston portion of said piston-valve member; a pressure relief conduit communicating with said space enclosed by the cylinder and the piston-valve member, a valve yieldably biased to the open position controlling said pressure relief conduit, an overflow tube responsive to fluid level having an open upper end, the lower end of said overflow tube communicating with means actuated by the presence of fluid in said overflow tube to close said last-named valve, said means including a diaphragm-operated valve having opened and closed positions yieldably biased to the closed position, said diaphragm being in fluid communication with said overflow tube, whereby fluid pressure in said overflow tube will cause said diaphragm operated valve to open when said overflow tube is full of fluid, a fluid conduit communicating said aperture externally of said valve end and the inlet side of said diaphragm-operated valve, a fluid conduit communicating between the outlet side of said diaphragm-operated valve and pressure-sensitive means for closing said pressure relief conduit controlling valve, whereby a small pressure in said overflow tube releases a larger pressure applied externally of said valve end to actuate said pressure-sensitive means; whereby the pressures on the piston portion and the valve end of said piston-valve member will become balanced through said first-named conduit, and the biased piston-valve member will move to the closed position, and a check-valve controlled bleeder passage operatively communicating with the lower end of said overflow tube, whereby fluid will be bled out of said overflow tube when said tank is empty, but reverse flow into said overflow tube is prevented.

2. A tank valve mechanism comprising a housing adapted to attach to the bottom of a tank, said housing having an aperture formed therein, valve means for opening and closing said aperture including a cylinder having one closed end and supported in axially aligned relationship with said aperture, a piston-valve member, the piston portion of which is slidable in said cylinder, the valve end of which forms a closure for said aperture, said housing being adapted to attach to said tank so that said valve end closes against the direction of flow through said aperture into said tank, means biasing said piston-valve member to the closed position, a fluid conduit communicating the space enclosed by said cylinder and the piston-valve member with the side of said valve end remote from said cylinder, whereby at least a part of fluid pressure applied externally against the valve end of said piston-valve member is applied also to the piston portion of said piston-valve member; a vessel supported adjacent the closed end of said cylinder, a fluid conduit connecting said vessel to the interior of said cylinder, and means for varying the fluid flow capacity of said conduit; a pressure relief conduit communicating with said space enclosed by the cylinder and the piston-valve member, a valve yieldably biased to the open position controlling said pressure relief conduit, an overflow tube responsive to fluid level having an open upper end, the lower end of said overflow tube communicating with means actuated by the presence of fluid in said overflow tube to close said last-named valve, whereby the pressures on the piston portion and the valve end of said piston-valve member will become balanced through said first-named conduit, and the biased piston-valve member will move to the closed position, and a check-valve controlled bleeder passage operatively communicating with the lower end of said overflow tube, whereby fluid will be bled out of said overflow tube when said tank is empty, but reverse flow into said overflow tube is prevented.

3. A tank valve mechanism comprising a housing adapted to attach to the bottom of a tank, said housing having an aperture formed therein, valve means for opening and closing said aperture including a cylinder having one closed end and supported in axially aligned relationship with said aperture, a piston-valve member, the piston portion of which is slidable in said cylinder, the valve end of which forms a closure for said tank so that said valve end closes against the direction of flow through said aperture into said tank, means biasing said piston-valve member to the closed position, a fluid conduit communicating the space enclosed by said cylinder and the piston-valve member with the side of said valve end remote from said cylinder, whereby at least a part of fluid pressure applied externally against the valve end of said piston-valve member is applied also to the piston portion of said piston-valve member; a pressure relief conduit communicating with said space enclosed by the cylinder and the piston-valve member, a valve yieldably biased to the open position controlling said pressure relief conduit, an overflow tube responsive to fluid level having an open upper end which terminates at an angle of about 45° and a small opening in the wall thereof adjacent to the open upper end, the lower end of said overflow tube communicating with means actuated by the presence of fluid in said overflow tube to close said last-named valve, whereby the pressures on the piston portion and the valve end of said piston-valve member will become balanced through said first-named conduit, and the biased piston-valve member will move to the closed position, and a check-valve controlled bleeder passage operatively communicating with the lower end of said overflow tube, whereby fluid will be bled out of said overflow tube when said tank is empty, but reverse flow into said overflow tube is prevented.

References Cited in the file of this patent

UNITED STATES PATENTS

| | | |
|---|---|---|
| 1,777,800 | Kantor et al. | Oct. 7, 1930 |
| 2,574,022 | Dahl | Nov. 6, 1951 |
| 2,620,818 | Symmons | Dec. 9, 1952 |
| 2,643,670 | Bryant | June 30, 1953 |
| 2,762,389 | Fraser | Sept. 11, 1956 |
| 2,835,266 | Morte | May 20, 1958 |